United States Patent
Lee et al.

(10) Patent No.: US 12,340,093 B2
(45) Date of Patent: Jun. 24, 2025

(54) MEMORY SYSTEM AND OPERATING METHOD FOR MULTI-PLANE PROGRAM THEREOF

(71) Applicant: SK hynix Inc., Gyeonggi-do (KR)

(72) Inventors: Kwang Hun Lee, Gyeonggi-do (KR); Ye Rin Kim, Gyeonggi-do (KR); Bu Yong Song, Gyeonggi-do (KR); Jae Gwan Kim, Gyeonggi-do (KR); Dong Young Seo, Gyeonggi-do (KR); Won Jun Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 69 days.

(21) Appl. No.: 18/336,015

(22) Filed: Jun. 16, 2023

(65) Prior Publication Data

US 2024/0201865 A1   Jun. 20, 2024

(30) Foreign Application Priority Data

Dec. 14, 2022   (KR) ........................ 10-2022-0174308

(51) Int. Cl.
   *G06F 3/06* (2006.01)
   *G06F 12/10* (2016.01)

(52) U.S. Cl.
   CPC ............ *G06F 3/0619* (2013.01); *G06F 3/064* (2013.01); *G06F 3/0659* (2013.01); *G06F 3/0679* (2013.01); *G06F 12/10* (2013.01)

(58) Field of Classification Search
   CPC ...... G06F 3/0619; G06F 3/064; G06F 3/0659; G06F 3/0679; G06F 12/10; G06F 3/0647; G06F 3/0652; G06F 3/0658; G11C 16/14; G11C 16/26
   See application file for complete search history.

(56) References Cited

U.S. PATENT DOCUMENTS

| | | | |
|---|---|---|---|
| 11,543,984 B2 * | 1/2023 | Choi | G06F 3/0614 |
| 2013/0254463 A1 * | 9/2013 | Matsunaga | G06F 12/0246 |
| | | | 711/103 |
| 2020/0097367 A1 * | 3/2020 | Kim | G06F 12/0246 |
| 2021/0132804 A1 * | 5/2021 | Hong | G11C 11/5642 |
| 2022/0107886 A1 * | 4/2022 | Palmer | G06F 12/0246 |
| 2022/0137836 A1 * | 5/2022 | Kang | G06F 11/073 |
| | | | 714/6.11 |
| 2023/0153001 A1 * | 5/2023 | Shim | G06F 3/0631 |
| | | | 711/154 |
| 2025/0004938 A1 * | 1/2025 | Song | G06F 12/0246 |

FOREIGN PATENT DOCUMENTS

| | | |
|---|---|---|
| KR | 10-0890017 B1 | 3/2009 |
| KR | 10-1399549 B1 | 5/2014 |
| KR | 10-2021-0051466 A | 5/2021 |

* cited by examiner

*Primary Examiner* — Sean D Rossiter
(74) *Attorney, Agent, or Firm* — IP & T GROUP LLP

(57) ABSTRACT

A memory system includes a memory device including a plurality of planes each including a plurality of memory blocks; and a memory controller for controlling the memory device to perform an operation on target blocks among the plurality of memory blocks, to store, in a replacement block, data stored in a bad block, on which the operation fails among the target blocks, and control the memory device to temporarily store, in a backup block, data stored in the other blocks except the bad block among the target blocks according to a number of free blocks included in the memory device.

17 Claims, 9 Drawing Sheets

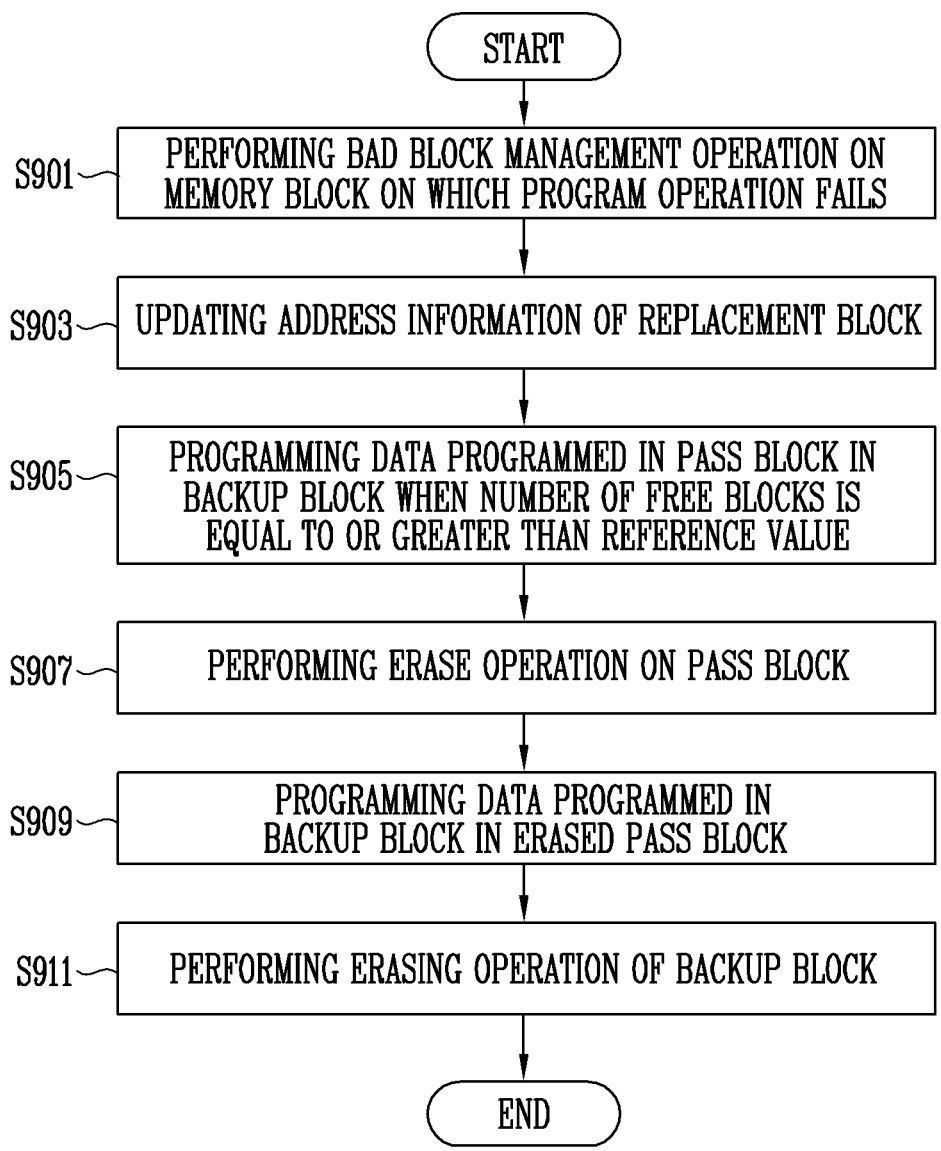

MEMORY SYSTEM AND OPERATING METHOD FOR MULTI-PLANE PROGRAM THEREOF

CROSS-REFERENCE TO RELATED APPLICATION

The present application claims priority under 35 U.S.C. § 119(a) to Korean patent application number 10-2022-0174308, filed on Dec. 14, 2022, the entire disclosure of which is incorporated herein by reference.

BACKGROUND

1. Field of Invention

Embodiments of the present disclosure generally relate to an electronic device, and more particularly, to a memory system and an operating method thereof.

2. Description of Related Art

A memory system is a device which stores data under the control of a host device such as a computer or a smart phone. A storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

The nonvolatile memory device may include a plurality of memory blocks in which data is stored. When data is programmed in the plurality of memory blocks and a program operation on a memory block fails, it is difficult to ensure the reliability of data in the other memory blocks in which the program operation passes.

SUMMARY

Embodiments of the present disclosure provide a memory system capable of selectively moving data according to a number of free blocks, and an operating method of the memory system.

In accordance with an embodiment of the present disclosure, there is provided a memory system including: a memory device including a plurality of planes each including a plurality of memory blocks; and a memory controller configured to: control the memory device to perform an operation on target blocks among the plurality of memory blocks, store, in a replacement block, data stored in a bad block when on which the operation fails among the target blocks, and to temporarily store, in a backup block, data stored in the other blocks except the bad block among the target blocks according to a number of free blocks included in the memory device.

In accordance with another embodiment of the present disclosure, there is provided a method of operating a memory system, the method including: controlling a memory device to perform an operation on target blocks among a plurality of memory blocks included in each of a plurality of planes; controlling the memory device to store, in a replacement block, data stored in a bad block when on which the operation fails among the target blocks; and controlling the memory device to temporarily store, in a backup block, data stored in the other blocks except the bad block among the target blocks according to a number of free blocks included in the memory device.

BRIEF DESCRIPTION OF THE DRAWINGS

Example embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 9 is a flowchart illustrating an operation of the memory controller in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
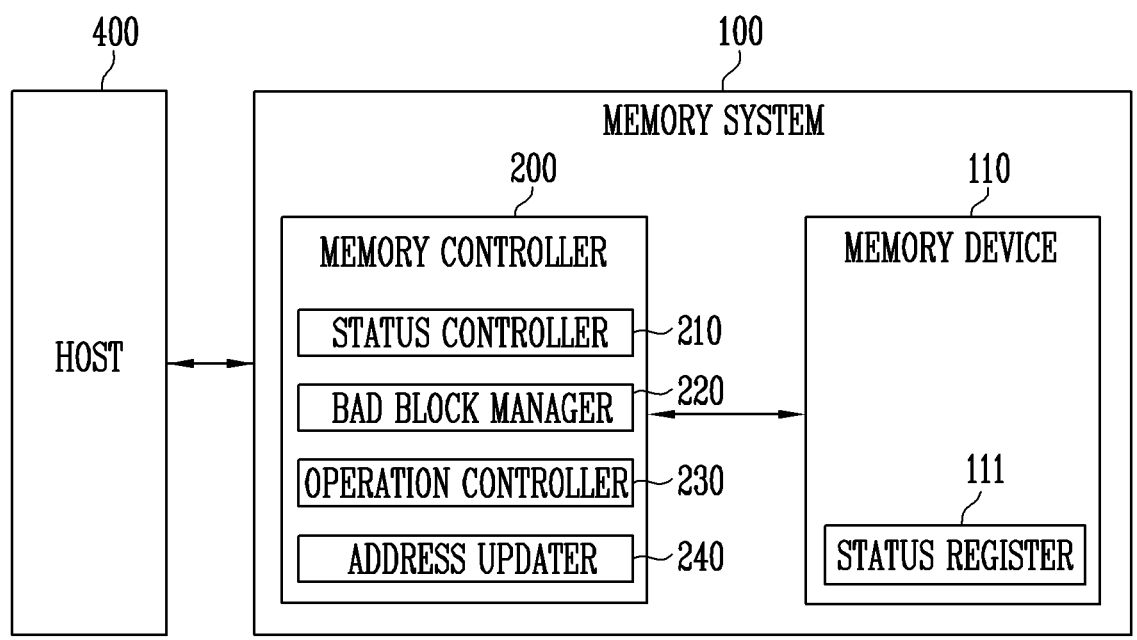
FIG. 1 is a diagram illustrating a memory system in accordance with an embodiment of the present disclosure.

FIG. 1 is a diagram illustrating a memory system in accordance with an embodiment of the present disclosure.

Referring to FIG. 1, the memory system 100 may include a memory device 110 and a memory controller 200.

The memory system 100 may be connected to a host 400 to be used. The host 400 may include a mobile phone, a smartphone, a laptop computer, a desktop computer, a TV, a game console, a tablet PC, an in-vehicle infotainment system, a drone, an autonomous vehicle, and the like. The host 400 may control the memory system 100, thereby storing data in the memory device 110.

The memory system 100 may be manufactured as one of various types of storage devices according to a host interface as a communication scheme with the host 400. For example, the memory system 100 may be configured as one of a variety of types of storage devices, such as a Solid State Drive (SSD), a multimedia card in the form of an MMC, an eMMC, an RS-MMC and a micro-MMC, a secure digital card in the form of an SD, a mini-SD and a micro-SD, a Universal Serial Bus (USB) storage device, a Universal Flash Storage (UFS) device, a personal computer memory card international association (PCMCIA) card type storage device, a peripheral component interconnection (PCI) card type storage device, a PCI express (PCI-E) card type storage device, a Compact Flash (CF) card, a Smart Media Card (SMC), and a memory stick.

The memory system 100 may be manufactured as any of various package types. For example, the memory system 100 may be manufactured as any of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 110 may store data. The memory device 110 is operated under the control of the memory controller 200. The memory device 110 may include a memory cell array including a plurality of memory cells for storing data. The memory cell array may include a plurality of memory blocks. Each memory block may include a plurality of memory cells. One memory block may include a plurality of pages. In an embodiment, the page may be unit for programming data to the memory device 110 or reading data stored in the memory device 110. The memory block may be a unit for erasing data. In an embodiment, the memory device 110 may be a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 110 is a NAND flash memory is described.

In an embodiment, the memory device 110 may be implemented in a three-dimensional array structure. The present disclosure may be applied to not only a flash memory device in which a charge storage layer is configured with a conductive floating gate (FG) but also a charge trap flash (CTF) in which a charge storage layer is configured with an insulating layer.

In an embodiment, each of the memory cells included in the memory device 110 may be configured as a Single Level Cell (SLC) storing one data bit. Also, each of the memory cells included in the memory device 110 may be configured as a Multi-Level Cell (MLC) storing two data bits, a Triple Level Cell (TLC) storing three data bits, or a Quad Level Cell (QLC) storing four data bits.

In an embodiment, the memory device 110 may include a plurality of planes. The memory device 110 including the plurality of planes will be described later with reference to FIG. 3.

The memory controller 200 may control overall operations of the memory device 110.

When power is applied to the memory system 100, the memory controller 200 may execute firmware (FW). When the memory device 110 is a flash memory device, the memory controller 200 may execute FW such as a Flash Translation Layer (FTL) for controlling communication between the host 400 and the memory device 110. When power is applied to the memory system 100, the memory controller 200 may read data necessary for booting from a ROM.

In an embodiment, the memory controller 200 may receive data and a Logical Block Address (LBA) from the host 400, and translate the LBA into a Physical Block Address (PBA) representing an address of memory cells included in the memory device 110, in which data is to be stored. Also, the memory controller 200 may store, in a buffer memory (not shown), a logical-physical address mapping table representing a mapping relationship between LBAs and PBAs.

The memory controller 200 may include a status controller 210, a bad block manager, an operation controller 230, and an address updater 240.

The memory controller 200 may control the memory device 110 to program data input from the host 400 to the memory device 110. The memory controller 200 may control the memory device 110 to store data respectively in memory blocks included in the plurality of planes included in the memory device 110. Memory blocks in which data is to be programmed may be target blocks. The memory controller 200 may control the memory device 110 to simultaneously store data input from the host 400 in target blocks.

The status controller 210 may receive, from the memory device 110, information on a number of free blocks included in the memory device 110, and generate status information, based on the received information on the number of free blocks. The free block may be a memory block in which no data stored among the plurality of memory blocks included in the memory device 110. The status information may include information on a number of free blocks included in the memory device 110 and whether the number of free blocks is equal to or greater than a reference value. The reference value may be a predetermined arbitrary value. However, the reference value may vary according to the number of free blocks included in the memory device 110.

The bad block manager 220 may control the memory device 110 to store, in a replacement block, data stored in a bad block in the memory device 110. Also, the bad block manager 220 may provide an error occurrence signal to the operation controller 230. The bad block may be a memory block on which a program operation fails.

The operation controller 230 may control the memory device 110 to store, in a backup block, data stored in a memory block on which the program operation passes among target blocks, based on the error occurrence signal and the status information, and then re-store the data in the target blocks.

The address updater 240 may update mapping information. The mapping information may include logical-physical address mapping information including information on a PBA corresponding to a LBA provided from the host 400 and address information of a replacement block. The address information of the replacement block may include information on PBAs of replacement blocks among the memory blocks included in the memory device 110.

Figure 2:
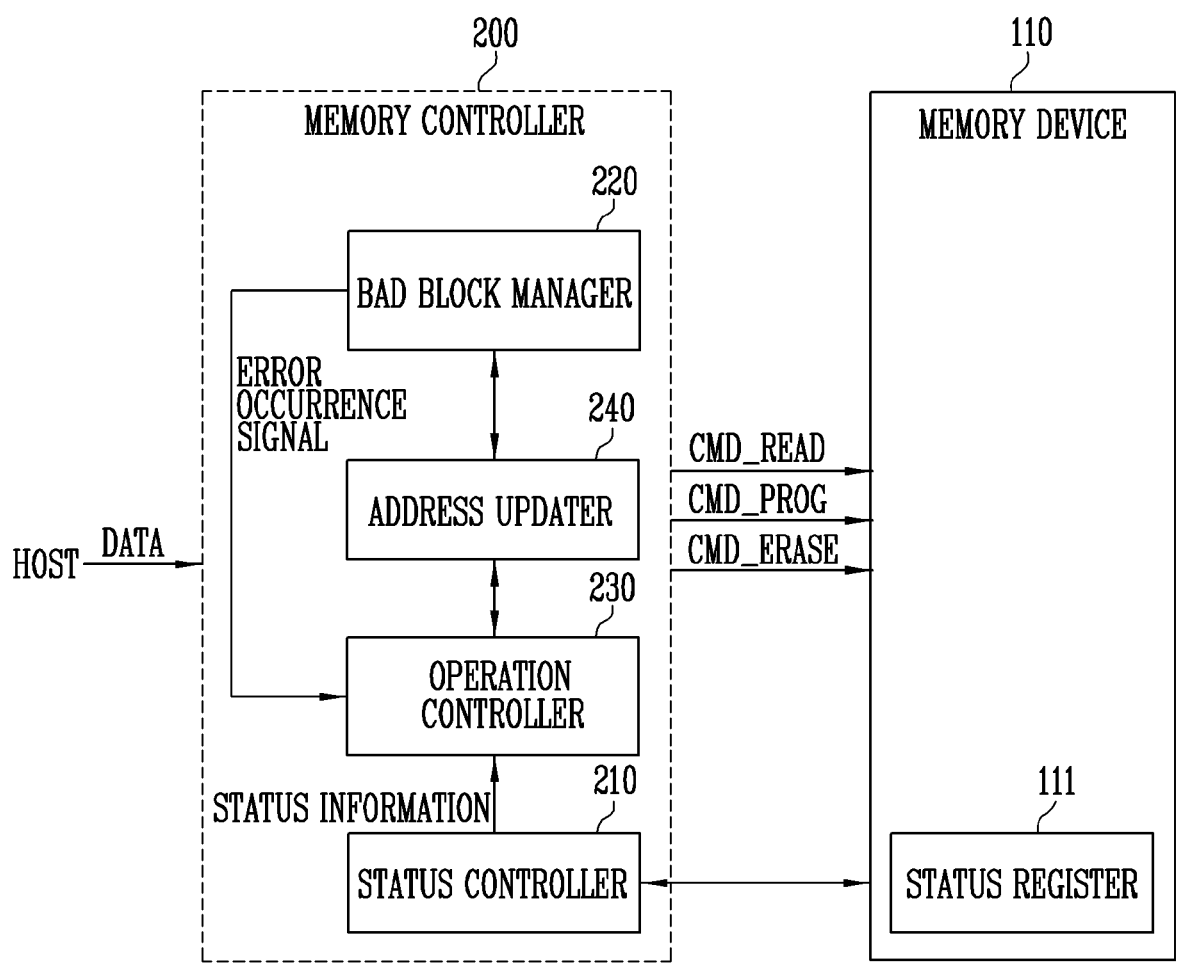
FIG. 2 is a diagram illustrating an operation of a memory controller in accordance with an embodiment of the present disclosure.

FIG. 2 is a diagram illustrating an operation of the memory controller in accordance with an embodiment of the present disclosure.

Referring to FIG. 2, the memory controller 200 may provide a command to the memory device 110 to control the memory device 110.

The memory controller 200 may control the memory device 110 to perform a program operation, a read operation, an erase operation, or the like according to a request of the host 400. In the program operation, the memory controller 200 may provide a program command CMD_PROG and data to the memory device 110. In the read operation, the memory controller 200 may provide a read command CMD_READ to the memory device 110. In the erase operation, the memory controller 200 may provide an erase command CMD_ERASE to the memory device 110.

The memory device 110 may receive a command and a logical address from the memory controller 200, and access an area selected by the address in the memory cell array. That is, the memory device 110 may perform an operation corresponding to the command on the area selected by the address. For example, the memory device 110 may perform a program operation (write operation), a read operation, and an erase operation. In the program operation, the memory device 110 may program data in the area selected by the address. In the read operation, the memory device 110 may read data from the area selected by the address. In the erase operation, the memory device 110 may erase data stored in the area selected by the address.

The memory device 110 may perform the program operation, the read operation, and the erase operation in response to the command received from the memory controller 200, and then store, in a status register 111, information on whether each operation passes. The status register 111 may store information on whether the operation passes by using one bit representing "1" or "0."

The memory device 110 may perform the program operation, the read operation, and the erase operation in response to the command received from the memory controller 200, and then provide the memory controller 200 with the information on whether the operation passes, which is stored in the status register 111.

The bad block manager 220 may check whether the program operation has failed, based on the information on whether the operation passes, which the memory device 110 provides. When the program operation fails in the memory device 110, the bad block manager 220 may generate a command such that data stored in a bad block is moved to a replacement block, based on the information on whether the operation passes, which the memory device 110 provides.

Specifically, the bad block manager 220 may provide the read command CMD_READ to the memory device 110 to read data stored in a memory block on which the program operation fails, and provide the program command CMD_PROG to the memory device 110 to program the read data in a replacement block. Also, the bad block manager 220 may provide the erase command CMD_ERASE to the memory device 110 to erase data stored in a bad block.

The bad block manager 220 may control the memory device 110 to program the data stored in the bad block in the replacement block, and then provide an error occurrence signal to the operation controller 230. The error occurrence signal may include information representing that the program operation has failed.

The bad block manager 220 may provide the error occurrence signal to the operation controller 230, and then provide the address updater with a physical address of a bad block on which the program operation fails and a physical address of a replacement block in which data is newly stored.

When data is stored in a replacement block among the memory blocks included in the memory device 110, the address updater 240 may remove an address of the replacement block from replacement block address information. Similarly, when some memory blocks among the memory blocks included in the memory device 110 are allocated as new replacement blocks, the address updater 240 may store a physical address of the newly allocated replacement blocks in the replacement block address information.

The status controller 210 may generate status information, based on the number of free blocks included in the memory device 110. The status information may include information on a number of free blocks included in the memory device 110 and whether the number of free blocks is equal to or greater than a reference value. The status controller 210 may provide the status information to the operation controller 230.

The operation controller 230 may generate a command to control the memory device 110, based on the error occurrence signal provided by the bad block manager 220 and the status information provided by the status controller 210.

For example, when the number of free blocks is equal to or greater than the reference value, the operation controller 230 may control the memory device 110 to re-program data stored in memory blocks on which the program operation passes among target blocks in the memory blocks.

In an embodiment, when the number of free blocks is equal to or greater than the reference value, the operation controller 230 may provide the read command CMD_READ to the memory device 110 to read data stored in memory blocks on which the program operation passes among target blocks. After that, the operation controller 230 may provide the program command CMD_PROG to the memory device 110 to temporarily store the read data in a backup block. After that, when the read data is programmed in the backup block, the operation controller 230 may provide the erase command CMD_ERASE to the memory device 110 to erase the data stored in the memory blocks on which the program operation passes. When an erase operation on the memory blocks on which the program operation passes is completed, the operation controller 230 may provide the read command CMD_READ and the program command CMD_PROG to the memory device 110 to read the data temporarily stored in the backup block and to re-store the read data in the memory blocks on which the erase operation is completed.

In an embodiment, when the number of free blocks is less than the reference value, the operation controller 230 may not provide any additional command to the memory device 110.

In an embodiment, the operation controller 230 may control the memory device 110 to program data provided by the host 400 in a physical address area corresponding to a logical address provided by the host 400.

For convenience of description, a case where the program operation in the memory device 110 fails is described. However, the present disclosure is not limited thereto.

Figure 3:
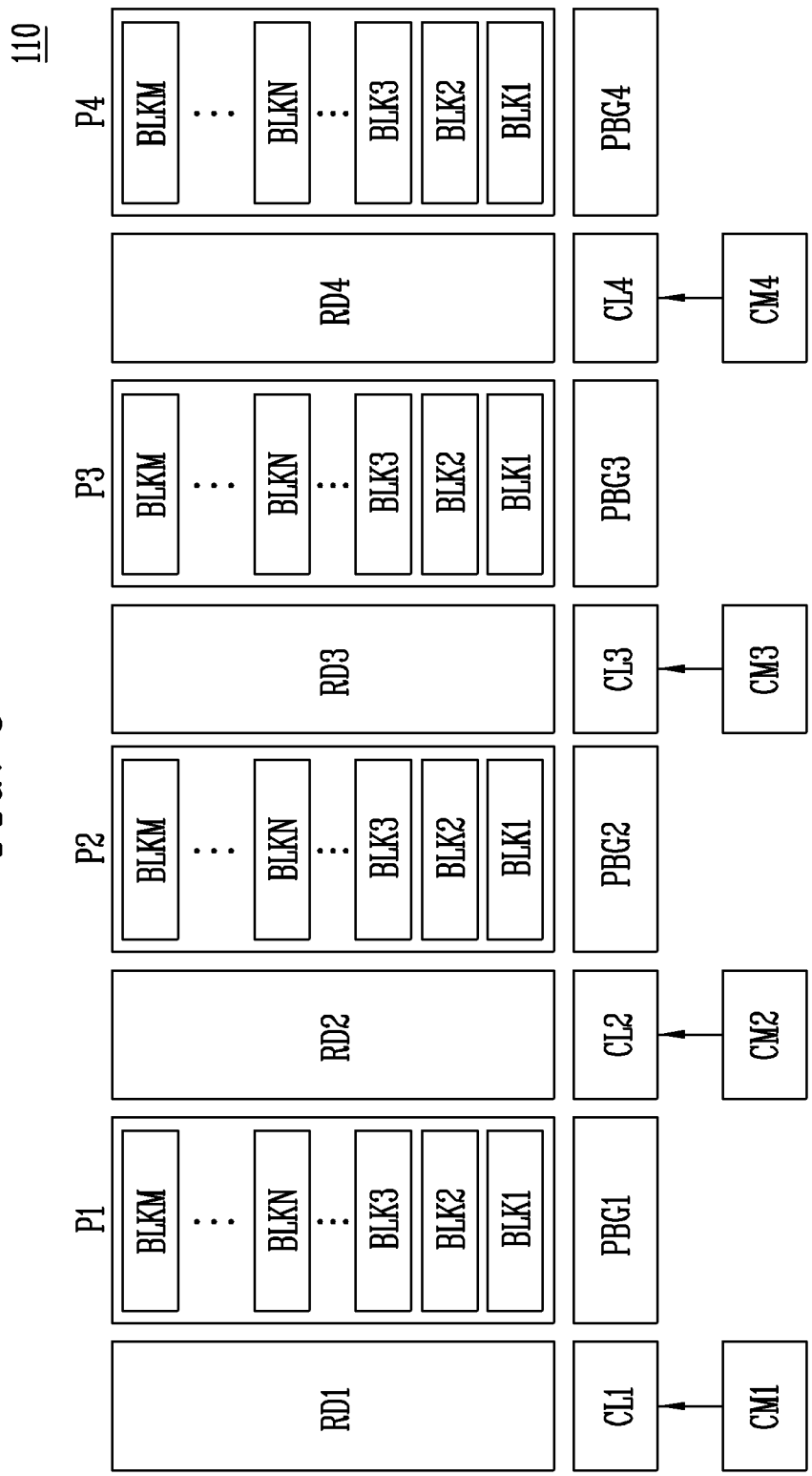
FIG. 3 is a diagram illustrating a memory device including a plurality of planes in accordance with an embodiment of the present disclosure.

FIG. 3 is a diagram illustrating a memory device including a plurality of planes in accordance with an embodiment of the present disclosure.

Referring to FIG. 3, a memory cell array (not shown) of the memory device 110 may include a plurality of planes P1 to P4. For example, first to fourth planes P1 to P4 may be included in the memory cell array in the memory device 110.

The first to fourth planes P1 to P4 may be independently operated. The first to fourth planes P1 to P4 may respectively include row decoders RD1 to RD4 and page buffer groups PBG1 to PBG4. For example, the first plane P1 may be operated while being connected to a first row decoder RD1 and a first page buffer group PBG1, the second plane P2 may be operated while being connected to a second row decoder RD2 and a second page buffer group PBG2, the third plane P3 may be operated while being connected to a third row decoder RD3 and a third page buffer group PBG3, and the fourth plane P4 may be operated while being connected to a fourth row decoder RD4 and a fourth page buffer group PBG4.

The memory device 110 including the plurality of planes P1 to P4 may perform a read, program or erase operation simultaneously or in parallel on memory blocks or pages, which are included in different planes. Control logics CL1 to CL4 included in the memory device 110 may perform a read, program or erase operation on memory blocks or pages, which are included in different planes. The plurality of planes P1 to P4 may respectively include independent control logics CL1 to CL4 corresponding thereto. For example, a first control logic CL1 may control the first plane P1 to perform a general operation on the first plane P1, a second control logic CL2 may control the second plane P2 to perform a general operation on the second plane P2, a third control logic CL3 may control the third plane P3 to perform a general operation on the third plane P3, and a fourth control logic CL4 may control the fourth plane P4 to perform a general operation on the fourth plane P4. The control logics CL1 to CL4 corresponding to the respective planes P1 to P4 may respectively control the row decoders RD1 to RD4 and the page buffer groups PBG1 to PBG4. Therefore, operations on the respective planes may be performed simultaneously or in parallel.

The control logics CL1 to CL4 may control the respective planes P1 to PL. In addition, all the control logics CL1 to CL4 may be integrated into one control logic such that the one control logic controls the planes P1 to P4.

In an embodiment, the memory controller 200 shown in FIG. 1 may provide a program command CMD_PROG, an address ADDR, and data to a channel CH to program the data in a first page of a first memory block BLK1 of the first plane P1, a first page of a first memory block BLK1 of the second plane P2, a first page of a first memory block BLK1 of the third plane P3, and a first page of a first memory block BLK1 of the fourth plane P4. The address ADDR may include a plane address PADD, a column address CADD, and a row address RADD.

The memory device 110 may store the data received from the memory controller 200 in the page buffer groups PBG1 to PBG4. In an embodiment, data to be stored in the first page of the first memory block BLK1 of the first plane P1 may be stored in the first page buffer group PBG1, data to be stored in the first page of the first memory block BLK1 of the second plane P2 may be stored in the second page buffer group PBG2, data to be stored in the first page of the first memory block BLK1 of the third plane P3 may be stored in the third page buffer group PBG3, and data to be stored in the first page of the first memory block BLK1 of the fourth plane P4 may be stored in the fourth page buffer group PBG4. After that, the data stored in the page buffer groups PBG1 to PBG4 may be programmed at a corresponding address. An operation of programming data in the respective planes P1 to P4 may be simultaneously performed.

The memory controller 200 may provide an address ADDR and a read command CMD_READ to the channel CH to read data stored in the first page of the first memory block BLK1 of the first plane P1, the first page of the first memory block BLK1 of the second plane P2, the first page of the first memory block BLK1 of the third plane P3, and the first page of the first memory block BLK1 of the fourth plane P4. The address ADDR may include a plane address PADD, a column address CADD, and a row address RADD.

The memory device 110 store data stored in memory blocks included in the respective planes P1 to P4 in the respective page buffer groups PBG1 to PBG4 in response to the read command CMD_READ received from the memory controller 200. In an embodiment, data stored in the first page of the first memory block BLK1 of the first plane P1 may be stored in the first page buffer group PBG1, data stored in the first page of the first memory block BLK1 of the second plane P2 may be stored in the second page buffer group PBG2, data stored in the first page of the first memory block BLK1 of the third plane P3 may be stored in the third page buffer group PBG3, and data stored in the first page of the first memory block BLK1 of the fourth plane P4 may be stored in the fourth page buffer group PBG4. After that, the data stored in the page buffer groups PBG1 to PBG4 may be output to the memory controller 200. An operation of reading data stored in the respective planes P1 to P4 may be simultaneously performed.

For convenience of description, a case where the memory device 110 includes four planes P1 to P4 has been shown. However, the present disclosure is not limited to this embodiment.

Figure 4:
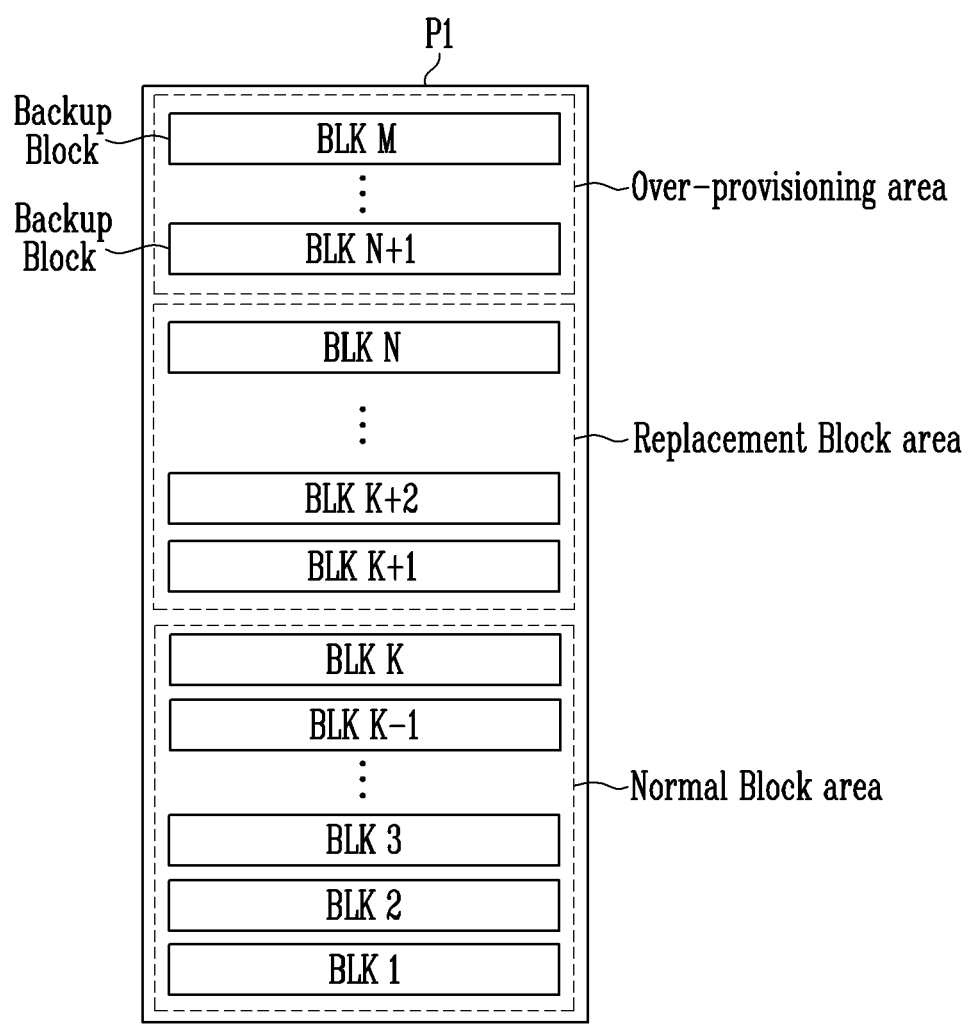
FIG. 4 is a diagram illustrating a structure of one plane in accordance with an embodiment of the present disclosure.

FIG. 4 is a diagram illustrating a structure of one plane in accordance with an embodiment of the present disclosure.

Referring to FIG. 4, a plurality of memory blocks included in one plane may be allocated to a normal area and an over-provisioning area.

One plane P1 may be divided into a normal area and an over-provisioning area. The normal area may be divided into a user data area (not shown) a meta-data area (not shown).

The user data area may be an area in which data provided by the host 400 shown in FIG. 1. For example, memory blocks allocated to the user data area may store data provided by the host 400.

The user data area may be divided into a normal block area and a replacement block area. The normal block area may include memory blocks for storing data provided by the host 400 shown in FIG. 1. The replacement block area may include normal memory blocks for replacing a bad block when the bad block occurs as a program operation fails.

The memory blocks allocated to each of the normal block area and the replacement block area may be changed.

In an embodiment, some memory blocks among the memory blocks included in the normal block area may be allocated to the replacement block area. On the contrary, some memory blocks among the memory blocks included in the replacement block area may be allocated to the normal block area.

The meta-data area may be an area in which meta-data is stored. The meta-data may include host related data Host_data, mapping related data Mapping_data, firmware related data FW_data, and the like. The meta-data may be data necessary for driving of the memory system 100 shown in FIG. 1.

The over-provisioning area may include memory blocks pre-allocated for an available space among the memory blocks included in the memory device 110 shown in FIG. 1. Some memory blocks among the memory blocks allocated to the over-provisioning area may be allocated as backup blocks. The backup block may be a block allocated to store data stored in a memory block on which a program operation fails when the program operation fails. For example, referring to FIG. 4, the over-provisioning area may include some memory blocks BLK N+1 to BLK M among the memory blocks included in the one plane P1.

The memory blocks allocated to the over-provisioning may be changed.

In an embodiment, the allocated backup blocks may be changed. For example, a memory block which is not allocated as the backup block among the memory blocks allocated to the over-provisioning area may be allocated as a backup block. In another example, the memory block allocated as the backup block may be excluded from the backup blocks.

Figure 5:
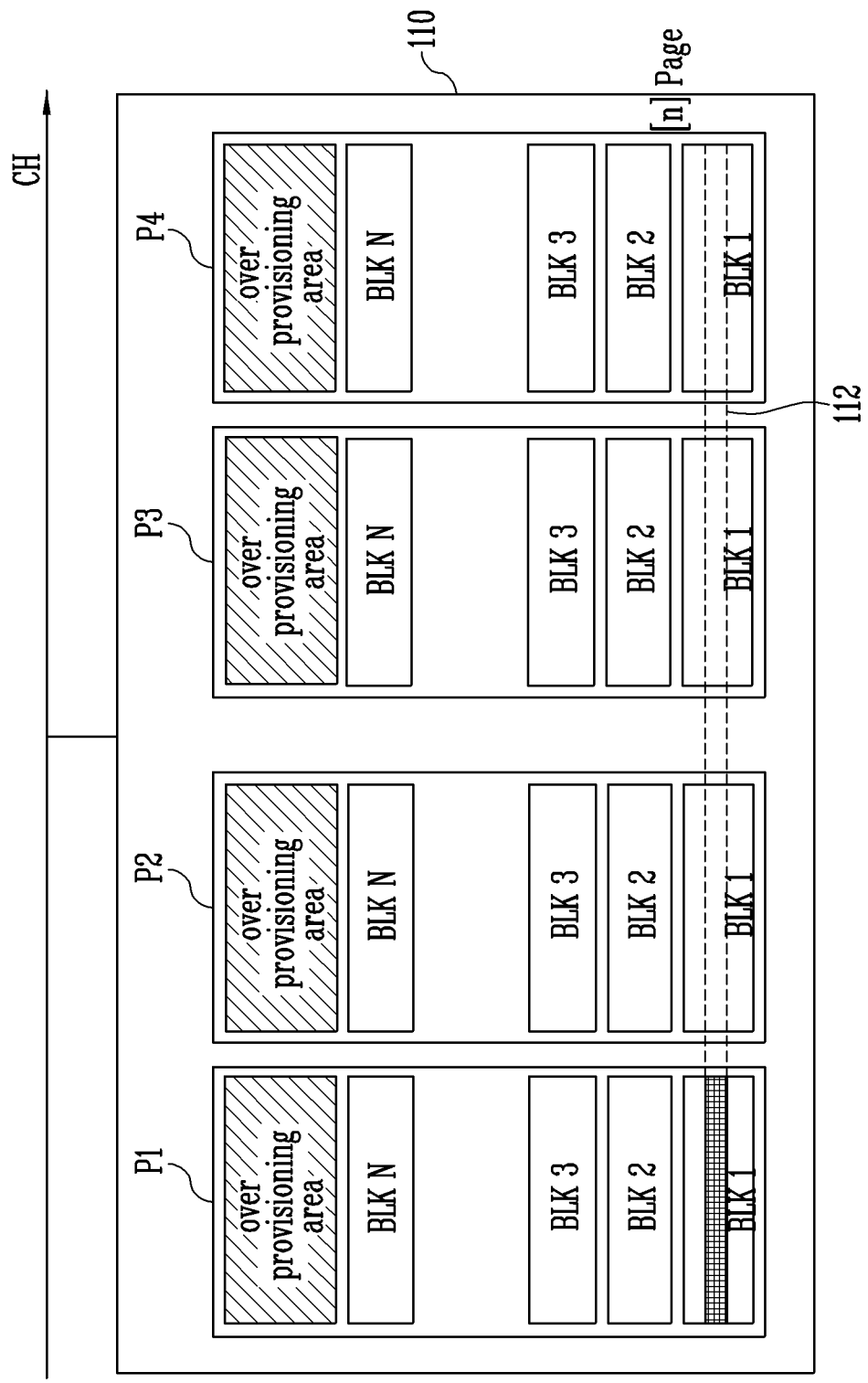
FIG. 5 is a diagram illustrating a case where a program operation fails in accordance with an embodiment of the present disclosure.

FIG. 5 is a diagram illustrating a case where a program operation fails in accordance with an embodiment of the present disclosure.

Figure 6:
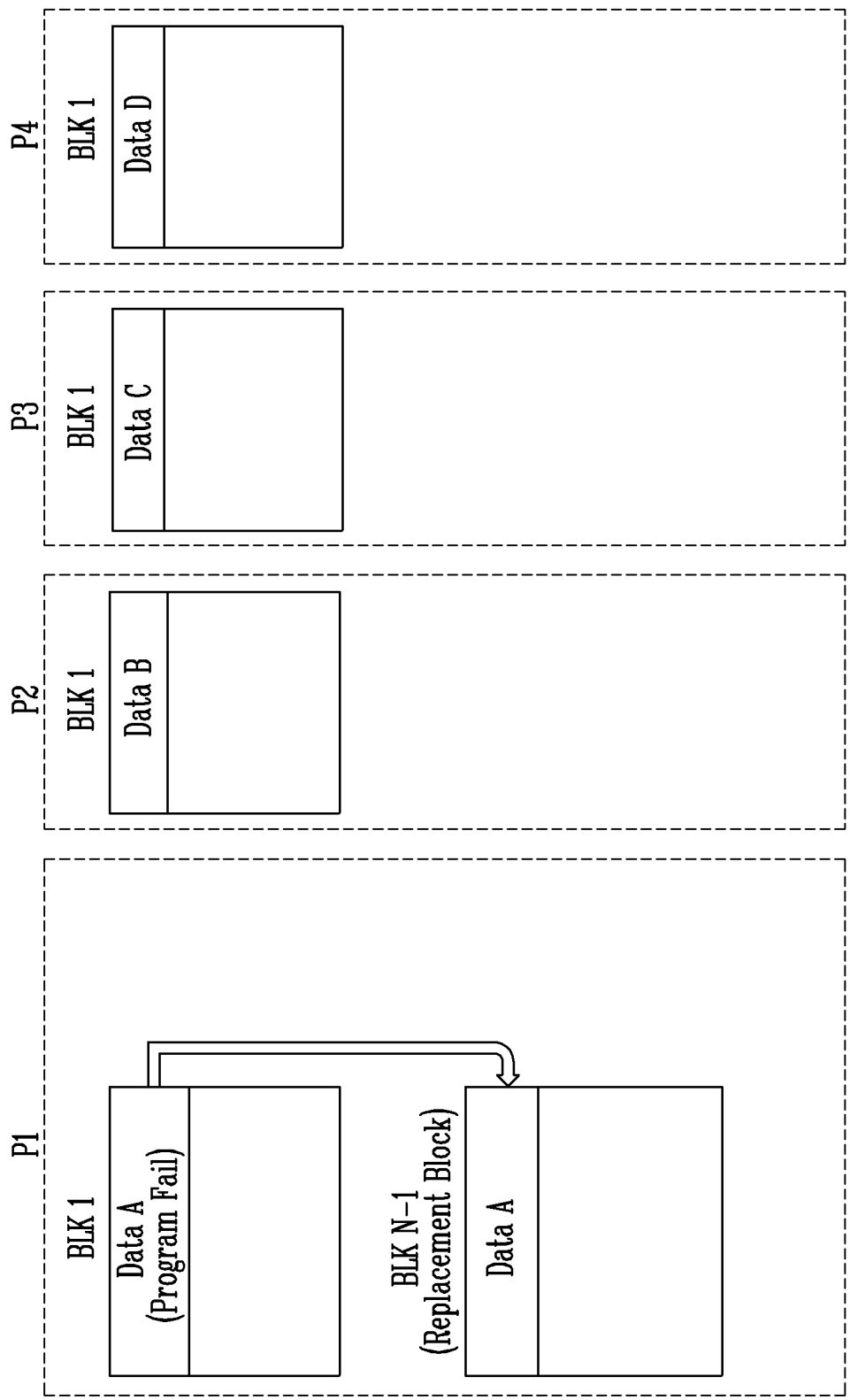
FIG. 6 is a diagram illustrating a block management operation performed when a number of free blocks is less than a reference value in accordance with an embodiment of the present disclosure.

FIG. 6 is a diagram illustrating a block management operation performed when a number of free blocks is less than a reference value in accordance with an embodiment of the present disclosure.

Figure 7:
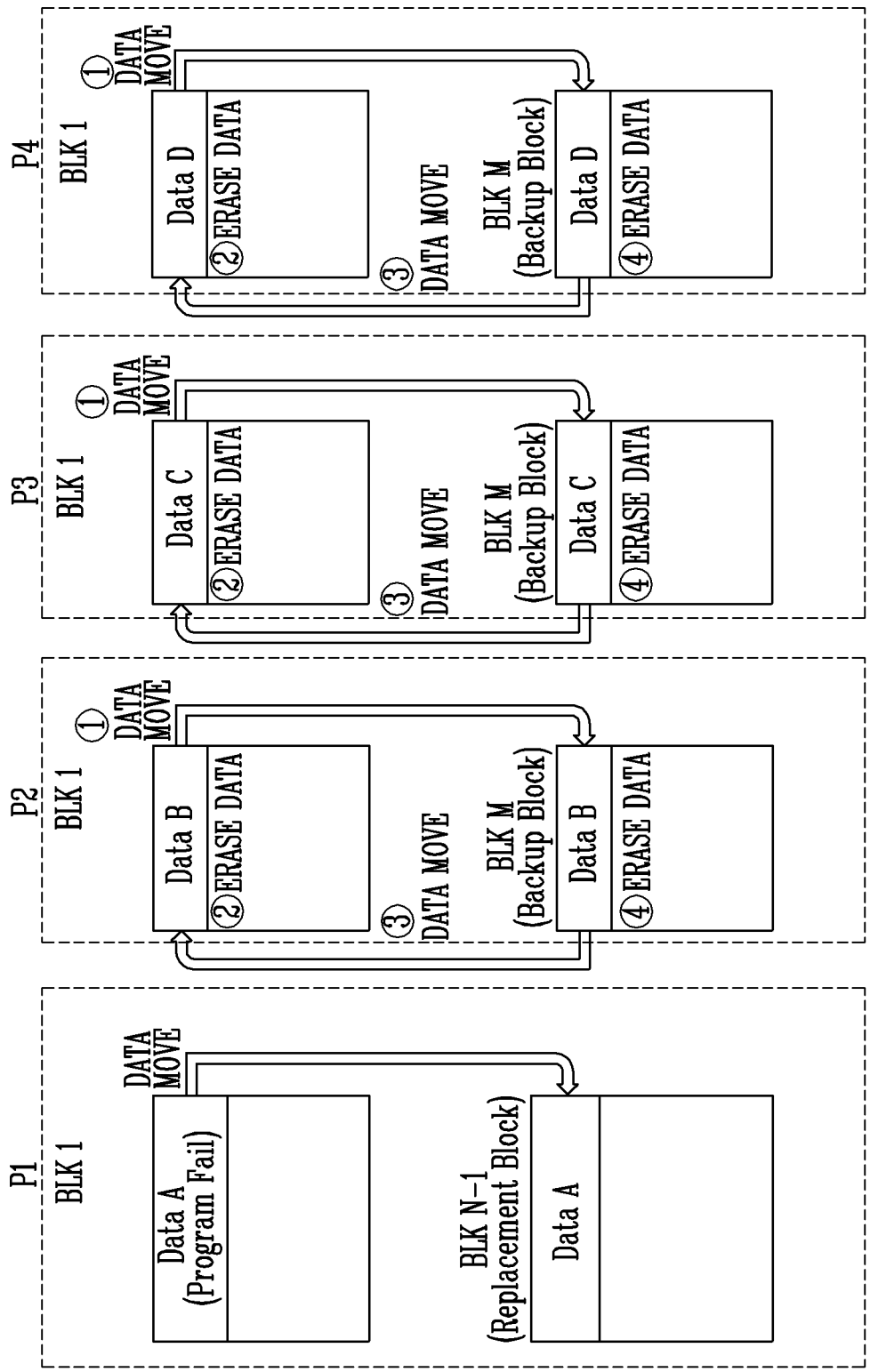
FIG. 7 is a diagram illustrating a block management operation performed when the number of free blocks is equal to or greater than the reference value in accordance with an embodiment of the present disclosure.

FIG. 7 is a diagram illustrating a block management operation performed when the number of free blocks is equal to or greater than the reference value in accordance with an embodiment of the present disclosure.

For convenience of description, the memory controller 200 provides a program command to an nth page PGn of a first memory block BLK1 included in each of a plurality of planes P1 to P4.

The memory controller 200 shown in FIG. 1 may control the memory device 110 to program data in each of an nth page PGn of a first plane P1, an nth page PGn of a second plane P2, an nth page PGn of a third plane P3, and an nth page PGn of a fourth plane P4.

Referring to FIGS. 6 and 7, data to be stored in the nth page PGn of the first plane P1 is dataA DATA A, data to be stored in the nth page PGn of the second plane P2 is dataB DATA B, data to be stored in the nth page PGn of the third plane P3 is dataC DATA C, and data to be stored in the nth page PGn of the fourth plane P4 is dataD DATA D.

In an embodiment, target blocks may be a first memory block BLK1 of the first plane P1, a first memory block BLK1 of the second plane P2, a first memory block BLK1 of the third plane P3, and a first memory block BLK1 of the fourth plane P4. nth pages PGn of the first memory blocks BLK1 included in the respective planes P1 to P4 may be allocated as one super block 112.

As shown in FIG. 5, for convenience of description, a program operation on the nth page PGn of the first memory block BLK1 of the first plane P1 fails. A bad block may be the first memory block BLK1 included in the first plane P1. Pass blocks may be the first memory blocks BLK1 included in the second plane P2, the third plane P3, and the fourth plane P4.

Referring back to FIG. 6, a block management operation performed when a number of free blocks is less than a reference value is illustrated.

The bad block manager 220 shown in FIG. 2 may provide a command such that data stored in the bad block is moved to a replacement block, based on information on whether an operation received from the memory device 110 passes.

Specifically, the bad block manager 220 may provide a read command CMD_READ and an address ADDR to the memory device 110 to read data DATA A stored in the bad block. After that, the bad block manager 220 may provide a program command CMD_PROG and an address BLK N−1 of a replacement block to the memory device 110 to store the read data DATA A in the replacement block BLK N−1.

The bad block manager 220 may provide an error occurrence signal to the operation controller 230.

The status controller 210 may provide the operation controller 230 with status information as information representing a number of free blocks included in the memory device 110 and whether the number of free blocks is equal to or greater than the reference value.

The operation controller 230 may determine whether data DATA B, C, and D stored in the pass blocks are to be moved, based on the error occurrence signal received from the bad block manager 220 and the status information received from the status controller 210.

As shown in FIG. 6, when the number of free blocks is less than the reference value, the operation controller 230 may not generate any additional command. Therefore, a moving operation on the data DATA B, C, and D stored in the first memory block BLK1 of the second plane P2, in the first memory block BLK1 of the third plane P3, and the first memory block BLK1 of the fourth plane P4 may not be performed.

Referring back to FIG. 7, the block management operation performed when the number of free blocks is equal to or greater than the reference value is illustrated.

The bad block manager 220 shown in FIG. 2 may provide a command to the memory device 110 to move the data stored in the bad block to the replacement block, based on the information on whether the operation received from the memory device 110 passes.

Specifically, the bad block manager 220 may provide a read command CMD_READ and an address ADDR to the memory device 110 to read the data DATA A stored in the bad block. After that, the bad block manager 220 may provide a program command CMD_PROG and an address BLK N−1 of the replacement block to the memory device 110 to store the read data DATA A in the replacement block BLK N−1.

The bad block manager 220 may provide an error occurrence signal to the operation controller 230.

The status controller 210 may provide the operation controller 230 with status information as information representing a number of free blocks included in the memory device 110 and whether the number of free blocks is equal to or greater than the reference value.

The operation controller 230 may determine whether the data DATA B, C, and D stored in the pass blocks are to be moved, based on the error occurrence signal received from the bad block manager 220 and the status information received from the status controller 210.

The operation controller 230 may control the memory device 110 to perform a reprogram operation of moving the data stored in the pass blocks to backup blocks and then re-storing the data in the pass blocks.

Specifically, the operation controller 230 may provide a read command CMD_READ and an address ADDR to the memory device 110 to read data stored in an nth page PGn of the first memory block BLK1 of the second plane P2, an nth page PGn of the first memory block BLK1 of the third plane P3, and an nth page PGn of the first memory block BLK1 of the fourth plane P4.

The operation controller 230 may provide a program command CMD_PROG, the data DATA B, C, and D, and an address ADDR to the memory device 110 to store the read data DATA B, C, and D in backup blocks. The backup blocks in which the read data DATA B, C, and D are to be stored may correspond to one of the memory blocks included in the over-provisioning area. That is, operation controller 230 may provide the memory device 110 with the read data DATA B, C, and D and an address BLK M of the backup blocks.

After that, the operation controller 230 may provide an erase command CMD_ERASE and an address ADDR to the memory device 110 to perform an erase operation on the pass blocks.

When the erase operation on the first memory block BLK1 of the second plane P2, the first memory block BLK1 of the third plane P3, and the first memory block BLK1 of the fourth plane P4 is completed, the operation controller 230 may provide a program command CMD_PROG, the data DATA B, C, D, and an address ADDR to the memory device 110 to read the data stored in the backup blocks, and to re-store the read data DATA B, C, and D in the first memory block BLK1 of the second plane P2, the first memory block BLK1 of the third plane P3, and the first memory block BLK1 of the fourth plane P4.

Also, the operation controller 230 may provide an erase command CMD_ERASE and the address ADDR of the backup blocks to the memory device 110 to erase the data stored in the backup blocks.

The performed reprogram operation, the performed read operation, and the performed erase operation are performed in units of planes. Therefore, the respective operations may be performed in parallel or simultaneously.

Figure 8:
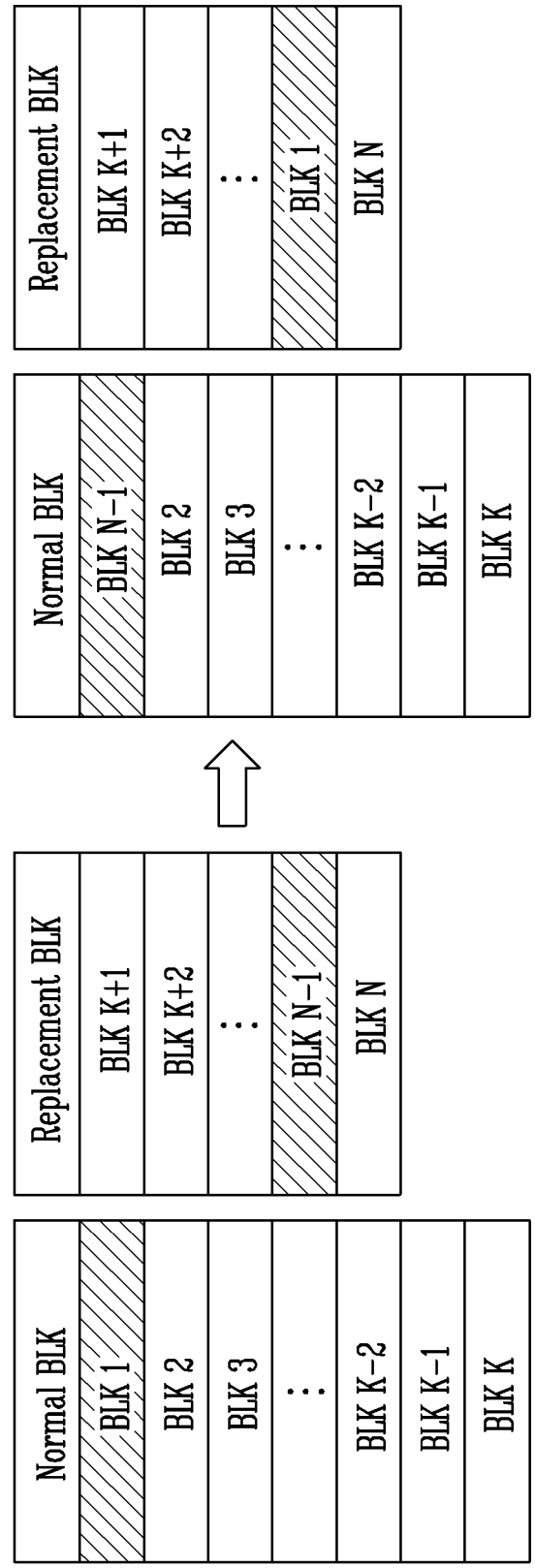
FIG. 8 is a diagram illustrating a process of updating address information of replacement blocks in accordance with an embodiment of the present disclosure.

FIG. 8 is a diagram illustrating a process of updating address information of replacement blocks in accordance with an embodiment of the present disclosure.

Referring to FIG. 8, the address information of the replacement blocks may include address information BLK 1 to BLK K of normal blocks and address information BLK K+1 to BLK N of replacement blocks. A number of the normal blocks may be greater than a number of the replacement blocks.

The address updater 240 may update the address information of the replacement blocks. As shown in FIG. 4, the replacement blocks may include predetermined free blocks.

After the bad block manager 220 performs a bad block management operation, the address updater 240 may receive a physical address of a bad block, received from the bad block manager 220, and an address of a replacement block in which data is stored.

Referring to FIG. 8, the predetermined replacement blocks may be memory blocks from a (K+1)th memory block BLK K+1 to an Nth memory block BLK N. The address information of the replacement blocks may be allocated for each of planes P1 to P4. The address information of the replacement blocks may vary according to the planes P1 to P4.

In an embodiment, when data stored in a first memory block BLK1 is moved to an (N−1)th memory block BLK N−1 as a program operation on the first memory block BLK1 fails, the bad block manager 220 may provide the address updater 240 with a physical address of the first memory block BLK1 and a physical address of the (N−1)th memory block BLK N−1.

The address updater 240 may update an address of the (N−1)th memory block BLK N−1 among the existing replacement block addresses to a normal block address.

Also, the address updater 240 may update an address of the first memory block BLK1 in which the data is erased, to a replacement block address. That is, when the bad block BLK1 is erased, the address updater 240 may designate the erased bad block BLK1 as a replacement block and may take the address of the erased bad block BLK1 as the address of the replacement block.

FIG. 9 is a flowchart illustrating an operation of the memory controller in accordance with an embodiment of the present disclosure.

The memory controller 200 may provide a program command CMD_PROG and data to the memory device 110 to simultaneously program the data in target blocks included in plurality of planes P1 to P4.

In operation S901, the memory device 110 may provide the bad block manager 230 with information on whether an operation passes. When a memory block on which a program operation fails occurs during the program operation of target blocks, the bad block manager 220 may control the memory device 110 to move data stored in the memory block on which the program operation fails to a replacement block. The bad block manager 220 may provide the memory device 110 with a read command CMD_READ, a program command CMD_PROG, and an erase command CMD_ERASE.

In operation S903, the address updater 240 may update address information of the replacement block. The address updater 240 may update a replacement block address at which the data is stored, to a normal block address. Also, the address updater 240 may update the replacement block address at which the data is erased, to a new replacement block address.

In operation S905, the operation controller 230 may generate a command such that data stored in pass blocks are reprogrammed, based on an error occurrence signal provided by the bad block manager 220 and status information provided by the status controller 210. When a number of free blocks is equal to or greater than a reference value, the operation controller 230 may provide a read command CMD_READ and a program command CMD_PROG to the memory device 110 to read the data stored in the pass blocks and to store the read data in backup blocks.

In operation S907, the operation controller 230 may provide an erase command CMD_ERASE to the memory device 110 to perform an erase operation on the pass blocks.

In operation S909, the operation controller 230 may provide a read command CMD_READ and a program command CMD_PROG to the memory device 110 to program the data stored in the backup blocks in the erased pass blocks.

In operation S911, the operation controller 230 may provide an erase command CMD_ERASE to the memory device 110 to perform erase operations on the backup blocks.

The operations S905 to S911 are operations performed on target blocks respectively included in the plurality of planes. Therefore, the operations S905 to S911 may be performed simultaneously or in parallel.

In accordance with the present disclosure, there is provided a memory system capable of moving data stored in pass blocks according to the number of free blocks, and an operating method of the memory system.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory system comprising:
 a memory device including a plurality of planes each including memory blocks, the memory device configured to perform an operation on target blocks among a plurality of memory blocks which are included in the plurality of planes; and
 a memory controller configured to:
 control the memory device to perform operations on the plurality of planes simultaneously or in parallel,
 store data stored in a bad block in a replacement block which is allocated to a normal area and included in a plane including the bad block, on which the operation fails among the target blocks, and
 control the memory device to temporarily store, in a backup block which is allocated to an over-provisioning area and included in the plane, data stored in the other blocks except the bad block among the target blocks when a number of free blocks included in the memory device is equal to or greater than a reference value.

2. The memory system of claim 1, wherein the operation is one of a program operation, a read operation, and an erase operation.

3. The memory system of claim 2, wherein the target blocks are included in each of the plurality of planes included in the memory device.

4. The memory system of claim 3, wherein the memory controller includes:
 a bad block manager configured to control the memory device to store the data stored in the bad block in the replacement block and configured to generate an error occurrence signal after controlling the memory device to store data in the bad block in the replacement block;
 a status controller configured to generate status information on a number of free blocks among the plurality of memory blocks and whether the number of free blocks is equal to or greater than the reference value;
 an operation controller configured to control, based on the status information, the memory device to perform a reprogram operation of storing the data stored in the backup block in the other blocks; and
 an address updater configured to update, when the data stored in the bad block is stored in the replacement block, mapping information including an physical address of the replacement block and a logical address provided by a host.

5. The memory system of claim 4, wherein the operation controller controls, when the number of free blocks is equal to or greater than the reference value, the memory device to store, in the backup block, the data stored in the other blocks based on the error occurrence signal.

6. The memory system of claim 5, wherein the operation controller is further configured to control, when the data stored in the other blocks is stored in the backup block, the memory device to perform an erase operation on the other blocks.

7. The memory system of claim 4, wherein the operation controller controls the memory device to perform the reprogram operation simultaneously on the other blocks.

8. The memory system of claim 3, wherein the program operation is simultaneously performed on the target blocks based on one program command provided by a host.

9. The memory system of claim 4, wherein the bad block manager is further configured to control, when the data stored in the bad block is stored in the replacement block, the memory device to erase the data stored in the bad block.

10. The memory system of claim 9, wherein the address updater is further configured to designate, when the data stored in the bad block is erased, the erased bad block as a new replacement block.

11. The memory system of claim 1, wherein the replacement block is allocated to each of the plurality of planes.

12. The memory system of claim 1, wherein the memory controller controls the memory device to store the data temporarily stored in the backup block in another memory block in the plurality of planes.

13. A method of operating a memory system, the method comprising:
 controlling a memory device to perform an operation on target blocks among a plurality of memory blocks included in a plurality of planes;
 controlling the memory device to store data stored in a bad block in a replacement block which is allocated to a normal area and included in a plane including the bad block, on which the operation fails among the target blocks; and
 controlling the memory device to temporarily store, in a backup block which is allocated to an over-provisioning area and included in the plane, data stored in the other blocks except the bad block among the target blocks when a number of free blocks included in the memory device is equal to or greater than a reference value.

14. The method of claim 13, wherein the controlling the memory device to store the data in the replacement block includes:
 updating mapping information between an address of the replacement block and a logical address provided by a host; and
 designating the bad block, which is erased, as a new replacement block.

15. The method of claim 13, further comprising:
controlling, when the number of free blocks is equal to or greater than the reference value, the memory device to perform an erase operation on the other blocks; and
programming, in the erased blocks, the data stored in the backup block.

16. The method of claim 13,
wherein the operation is one of a program operation, a read operation, and an erase operation, and
wherein, in the program operation, the data is simultaneously stored in the target blocks, based on one program command provided by a host.

17. The method of claim 13, further comprising storing, after the temporarily storing, the data stored in the backup block in another memory block included in the plurality of planes.

\* \* \* \* \*